No. 752,689. PATENTED FEB. 23, 1904.
L. KRIEGER.
ELECTRICALLY PROPELLED VEHICLE.
APPLICATION FILED FEB. 26, 1903.
NO MODEL. 3 SHEETS—SHEET 1.

Witnesses:
Jas. C. Wolmsmith.
Wilhelm Vogt.

Inventor:
Louis Krieger,
By J. Walter Douglas
Attorney

No. 752,689. PATENTED FEB. 23, 1904.
L. KRIEGER.
ELECTRICALLY PROPELLED VEHICLE.
APPLICATION FILED FEB. 26, 1903.
NO MODEL. 3 SHEETS—SHEET 2.

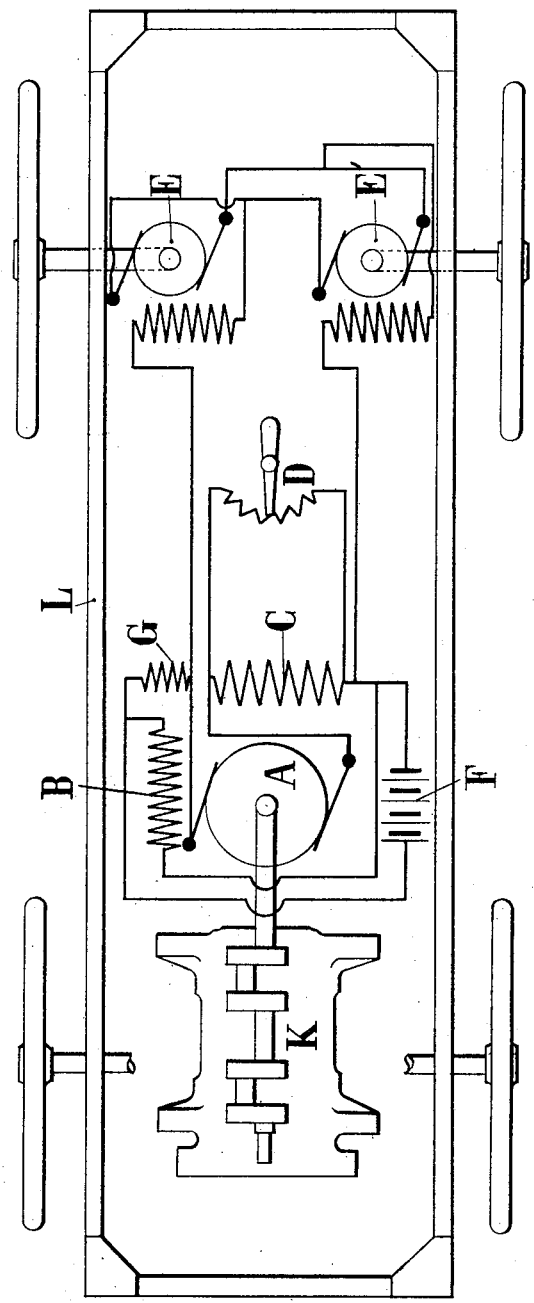

No. 752,689. Patented February 23, 1904.

UNITED STATES PATENT OFFICE.

LOUIS KRIEGER, OF COURBEVOIE, FRANCE.

ELECTRICALLY-PROPELLED VEHICLE.

SPECIFICATION forming part of Letters Patent No. 752,689, dated February 23, 1904.

Application filed February 26, 1903. Serial No. 145,200. (No model.)

*To all whom it may concern:*

Be it known that I, LOUIS KRIEGER, a citizen of the Republic of France, residing at Courbevoie, Seine, France, have invented a new and useful Improvement in Electrically-Propelled Vehicles, which improvement is fully set forth in the following specification.

Given an electrically-propelled vehicle comprising a generating-dynamo driven by an oil or other motor and one or two motors driving the wheels of the vehicle, it is the object of this invention to render the variations in speed of the vehicle entirely automatic, according to the nature and state of the road, in such a manner that the speed of the explosion (or other) motor and also the power delivered by the dynamo driven by it shall remain constant, and this without any action on the part of the driver. The way in which this result is obtained is shown in the annexed drawings, in which—

Figure 2:
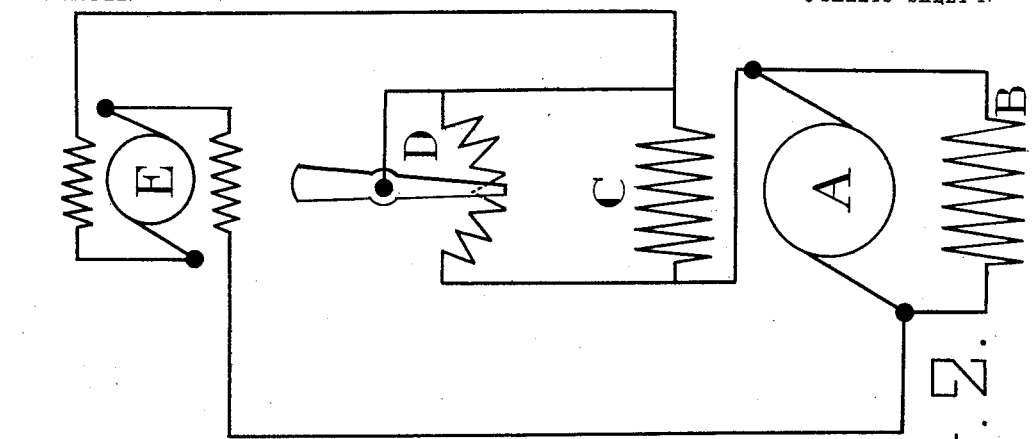
Figure 1:
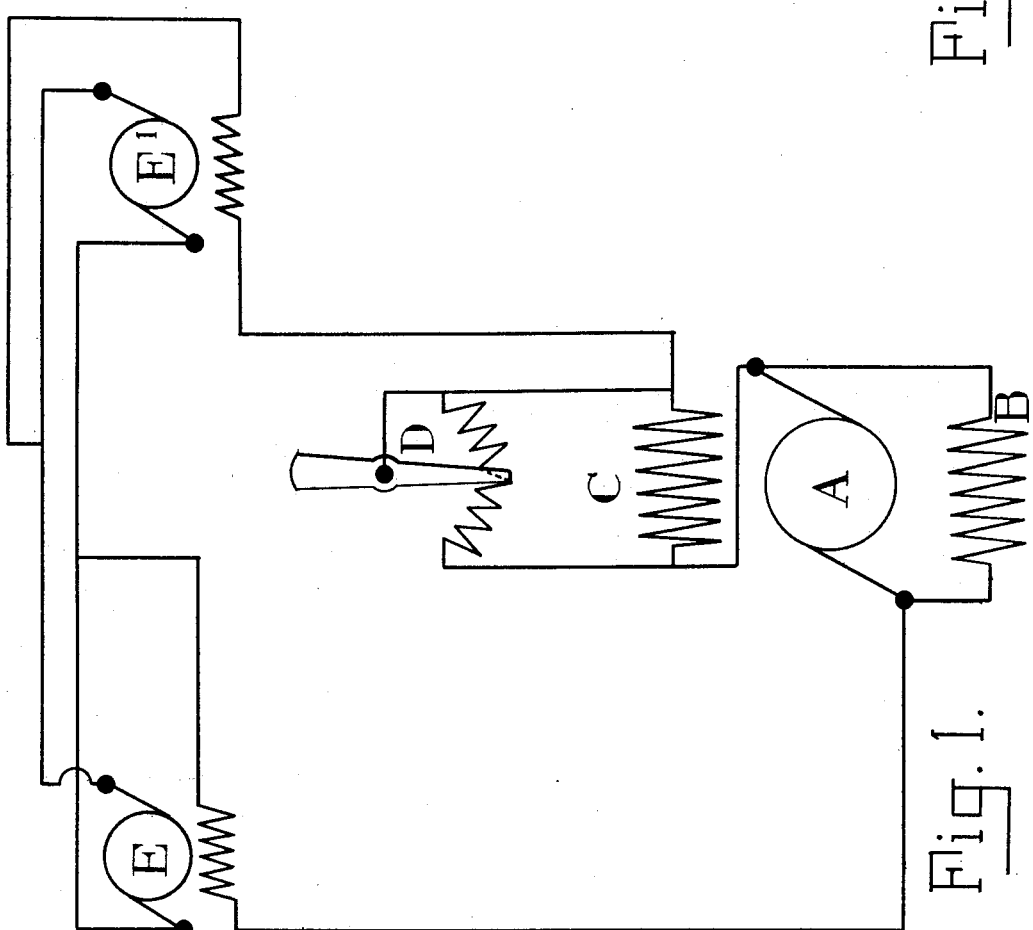
Figure 3:
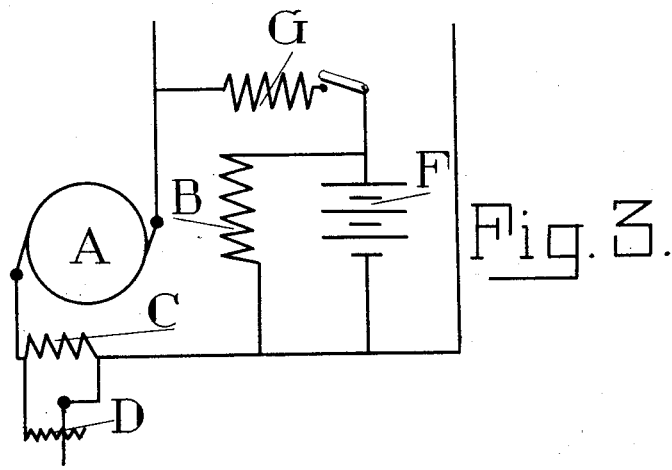
Figure 4:
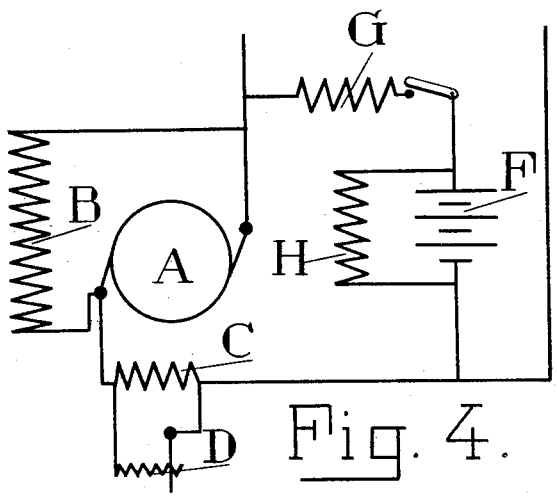
Figure 5:
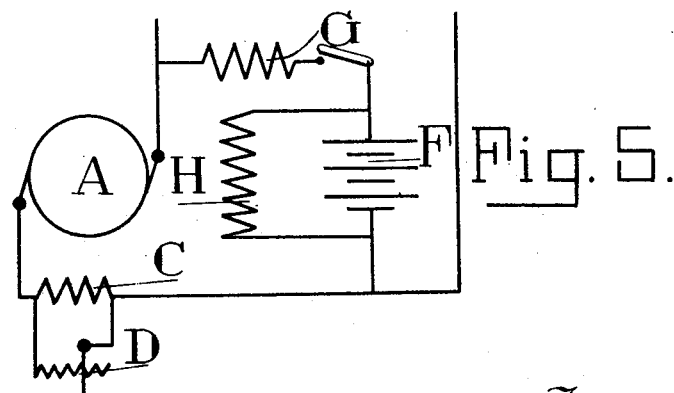

Figure 1 is a diagram showing one arrangement for a vehicle provided with two motors; Fig. 2, a similar diagram showing an arrangement for a vehicle having one motor. Figs. 3, 4, and 5 show modifications which have for their object to keep the generator charged. Fig. 6 is a plan view of a vehicle provided with an engine, dynamo, and two motors.

The dynamo A, driven by engine K, is excited by a differential winding the portion B of which is in a shunt from the brush-terminals and is wound in such a manner as to give a difference of potential in the normal direction corresponding to the forward movement of the vehicle L. The portion C wound in series tends, on the contrary, to demagnetize the field and to give an inverse difference of potential. The relative value of the two windings is such that calling $i$ the intensity of the current delivered by the dynamo, $e$ the difference of potential at the terminals of the dynamo, $w$ the watts delivered by the dynamo the equation $w = ei = $ constant is obtained. Under these conditions, as the intensity $i$ depends exclusively on the effort of traction, if this increases in consequence of an incline, for example, the intensity $i$ increases, but at the same time $e$ decreases. The vehicle therefore slows down automatically.

In order that the driver may control the speed of the vehicle, the series winding C may be shunted when desired by a shunt D, arranged as shown in the drawings. The driver can therefore control the extent to which the dynamo is demagnetized, and consequently can control $e$, upon which the speed of the vehicle depends.

In Fig. 1 is shown the arrangement adapted for a vehicle having two series motors E E' mounted in parallel and in Fig. 2 for a vehicle provided with a single series motor E. In order to avoid the generator being deprived of all current when the intensity of the current is too great, it is necessary to add to the shunt excitation taken from the terminals of the generator an independent and constant excitation furnished by a battery F of accumulators of but little power. This novel arrangement, which is shown diagrammatically in Fig. 3, 4, and 5, may be employed in two different manners.

In Fig. 3 the poles of the battery F are in connection with the extremities of the normal shunt-winding B of the generator. In this case whatever may be the difference of potential at the brushes there always passes through the shunt-winding a constant current sufficient to excite the machine. In order that the connection with the shunt-winding shall not short-circuit the battery through the armature at the moment at which the difference of potential is *nil*, I interpose between the shunt-winding and one of the brushes to which it is connected sufficient resistance G to insure that the current which passes in the said circuit shall be feeble. When the difference of potential at the brushes is great, there comes a moment at which the difference of potential between the terminals of the shunt-winding B is greater than the difference of potential of the battery F. The latter is then charged by the current passing through the excitation-shunt.

Fig. 4 shows another method of employing the novel arrangement. The battery F is connected to an entirely separate field-winding H. Under these conditions the excitation produced in this winding always exists whatever may be the difference of potential at the brushes;

but in order that there may be movement the battery is only allowed to serve as a source of supply for the current necessary for this excitation and, if necessary, charge itself, the brushes of the generator A being connected to the poles of the battery F by interposing a fixed resistance G sufficient that the battery, which is composed of a small number of elements, only takes just the current that it itself delivers to the independent excitation. If the difference of potential at the brushes is greater than the fall of voltage in the resistance and the independent winding for the intensity of the excitation chosen the battery charges itself.

In either case one of the poles of the battery is in connection with the circuit of the differential series winding of the generator. In effect under these conditions the generator and the motor (in this case the motor is an explosion-motor) which actuates it can be started by means of the small battery of accumulators. The generator A, working then as a motor, and the series excitation C, coöperating with the excitation-shunt B, allow, if necessary, of the the resistances interposed being momentarily short-circuited in order to obtain the couple necessary for starting the motor.

Fig. 5 shows a modification in which a switch I is interposed between the brush of the generator and the shunt field-winding H. The switch may be normally left opens, so that the shunt will be energized entirely by the battery F. The switch may be closed to recharge the battery or assist in energizing the shunt. The apparatus then becomes substantially that of Fig. 3.

By suitably increasing the number of the elements of the battery the resistances in the circuit may be done away with.

It will be seen that the dynamo and electric motor or motors serve merely to transmit the energy of the prime mover to the driving member of the vehicle. The dynamo shown in Figs. 1 and 2 excites itself by means of the shunt field-coil B. The series field-coil C cuts down the total field by an amount dependent on the adjustment of the resistance D and the current flowing through the external circuit. When the load on the electric motor or motors increases, the increased current, which tends to flow as the counter electromotive force of the motor decreases, increases the ampere-turns in the series coil, thereby cutting down the total field and the potential difference at the terminals of the dynamo. The battery F not only serves to maintain a field when it would otherwise be unduly depressed by an increased current delivered by the dynamo, but by reason of its connection to the armature through the series coil C may be used to drive the dynamo as a motor, and thereby start the prime mover. The modification shown in Fig. 4 provides plural main field-coils, one of which is energized entirely by current shunted from the dynamo and the other to a greater or lesser extent by the battery F, depending on the amount of the resistance G.

It is to be well understood that any kind of excitation and motor suitable for an ordinary electrically-driven vehicle may be employed and electrical brake appliances, all in combination with the system above described.

I claim—

1. A dynamo having shunt and series field-coils wound in opposition, the series coil being wound to decrease the field excitation as the current increases, and an adjustable resistance across said series coil, as set forth.

2. A dynamo having shunt and series field-coils wound in opposition, the series coil being wound to decrease the field excitation as the current increases, and normally remaining in circuit regardless of variations in the electromotive force and a battery in circuit with said shunt-coil, as set forth.

3. A dynamo having shunt and series field-coils wound in opposition, the series coil being wound to decrease the field excitation as the current increases, and normally remaining in circuit regardless of variations in the electromotive force, and a battery in circuit with said shunt and series coils, as set forth.

4. A dynamo having in its circuit a main field-coil and a series field-coil wound in opposition, the series coil being wound to decrease the field excitations as the current increases, and normally remaining in circuit regardless of variations in the electromotive force, and a battery in circuit with said main coil, as set forth.

5. A dynamo having a main field-coil and a series field-coil wound in opposition, the series coil being wound to decrease the field excitation as the current increases, and normally remaining in circuit regardless of variations in the electromotive force, and a battery in circuit with said main and series coils, as set forth.

6. A motor-vehicle, carrying a prime mover, a dynamo and an electric motor, said dynamo and motor serving to transmit the energy of the prime mover to the driving member of the vehicle, said dynamo having shunt and series field-coils wound in opposition, the series coil being wound to decrease the field excitation as the current increases, and an adjustable resistance across said series coil, as set forth.

7. A motor-vehicle, carrying a prime mover, a dynamo and an electric motor, said dynamo and motor serving to transmit the energy of the prime mover to the driving member of the vehicle, said dynamo having shunt and series field-coils wound in opposition, the series coil being wound to decrease the field excitation as the current increases, and a battery in circuit with said shunt-coil, as set forth.

8. A motor-vehicle, carrying a prime mover, a dynamo and an electric motor, said dynamo and motor serving to transmit the energy of the prime mover to the driving member of the vehicle, said dynamo having shunt and series field-coils wound in opposition, the series coil being wound to decrease the field excitation as the current increases, and a battery in circuit with said shunt and series coils, as set forth.

9. A motor-vehicle, carrying a prime mover, a dynamo and an electric motor, said dynamo and motor serving to transmit the energy of the prime mover to the driving member of the vehicle, said dynamo having shunt and series field-coils wound in opposition, a battery in circuit with said shunt-coil, and a resistance between said shunt-coil and battery and one of the terminals of the dynamo, as set forth.

10. A motor-vehicle, carrying a prime mover, a dynamo and an electric motor, said dynamo and motor serving to transmit the energy of the prime mover to the driving member of the vehicle, said dynamo having shunt and series field-coils wound in opposition, a battery in circuit with said shunt and series coils, and a resistance between said shunt-coil and battery and one of the terminals of the dynamo, as set forth.

11. A motor-vehicle, carrying a prime mover, a dynamo and an electric motor, said dynamo and motor serving to transmit the energy of said prime mover to the driving member of said vehicle, said dynamo having in its circuit a main field-coil and a series field-coil wound in opposition, the series coil being wound to decrease the field excitation as the current increases, and a battery in circuit with said main coil, as set forth.

12. A motor-vehicle, carrying a prime mover, a dynamo and an electric motor, said dynamo and motor serving to transmit the energy of said prime mover to the driving member of said vehicle, said dynamo having a main field-coil and a series field-coil wound in opposition, the series coil being wound to decrease the field excitation as the current increases, and a battery in circuit with said main and series coils, as set forth.

13. A motor-vehicle, carrying a prime mover, a dynamo and an electric motor, said dynamo and motor serving to transmit the energy of said prime mover to the driving member of said vehicle, said dynamo having plural main field-coils and a series field-coil wound in opposition to said main coils, one of said main coils in shunt with the terminals of the dynamo, and a battery in circuit with the other main coil, as set forth.

14. A motor-vehicle, carrying a prime mover, a dynamo and an electric motor, said dynamo and motor serving to transmit the energy of said prime mover to the driving member of said vehicle, said dynamo having plural main field-coils and a series field-coil wound in opposition to said main coils, one of said main coils in shunt with the terminals of the dynamo, a battery in circuit with the other main coil, and a resistance between the battery and the main coil energized thereby and one of the terminals of the dynamo, as set forth.

In testimony whereof I have signed this specification in the presence of two subscribing witnesses.

LOUIS KRIEGER.

Witnesses:
   PAUL DE MESTRAL,
   AUGUSTUS E. INGRAM.